United States Patent
Lei et al.

(10) Patent No.: US 10,017,073 B2
(45) Date of Patent: Jul. 10, 2018

(54) COOLANT CHANNELS FOR POWER MODULE ASSEMBLIES

(71) Applicant: Ford Global Technologies, LLC, Dearborn, MI (US)

(72) Inventors: Guangyin Lei, Dearborn Heights, MI (US); Michael W. Degner, Novi, MI (US); Edward Chan-Jiun Jih, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 177 days.

(21) Appl. No.: 15/065,164

(22) Filed: Mar. 9, 2016

(65) Prior Publication Data

US 2017/0259691 A1  Sep. 14, 2017

(51) Int. Cl.
*B60L 11/18* (2006.01)
*H01M 10/625* (2014.01)
*H01M 10/6568* (2014.01)

(52) U.S. Cl.
CPC ....... *B60L 11/1874* (2013.01); *B60L 11/1877* (2013.01); *H01M 10/625* (2015.04); *H01M 10/6568* (2015.04)

(58) Field of Classification Search
CPC ........... H05K 7/20927; H05K 7/20218; H05K 7/20272; H05K 7/1432; H05K 7/20854; H05K 7/20863; H05K 7/20881; H05K 7/20909; H01L 23/46; H01L 23/473; H01H 9/52; H01H 2009/526
USPC .......... 361/699–700; 165/80.4–80.5, 104.21, 165/104.33; 257/714
See application file for complete search history.

(56) References Cited

U.S. PATENT DOCUMENTS

| | | | |
|---|---|---|---|
| 3,648,113 A | 3/1972 | Rathjen et al. | |
| 4,186,422 A | 1/1980 | Laermer | |
| 5,125,451 A | 6/1992 | Matthews | |
| 5,170,319 A * | 12/1992 | Chao-Fan Chu | ... H01L 23/4338 165/170 |
| 6,329,089 B1 | 12/2001 | Roberts et al. | |
| 7,200,007 B2 | 4/2007 | Yasui et al. | |
| 7,835,151 B2 | 11/2010 | Olsesen | |
| 8,418,751 B2 | 4/2013 | Bezama et al. | |
| 8,537,551 B2 | 9/2013 | Ide et al. | |
| 8,895,173 B2 | 11/2014 | Gandhi et al. | |
| 8,971,041 B2 | 3/2015 | Sharaf et al. | |

(Continued)

*Primary Examiner* — Dion R Ferguson
*Assistant Examiner* — Amir Jalali
(74) *Attorney, Agent, or Firm* — David B. Kelley; Brooks Kushman P.C.

(57) ABSTRACT

A vehicle power module assembly is provided. The assembly may include a first frame, a second frame, and power stages. The first frame may define a first pair of coolant cavities. The second frame may define a second pair of coolant cavities in communication with the first pair of cavities to define a serial coolant path. Each of the frames may house one of the power stages disposed between the respective pairs of cavities such that coolant flowing through the cavities is in thermal communication with the power stages. The assembly may further include a pair of endplates, one of which defines a channel to divert coolant from a last of the pair of coolant cavities to the outlet cutouts in substantial registration with one another. Each of the first frame and second frame may further define a pass-through fluidly connecting the pair of coolant cavities.

5 Claims, 6 Drawing Sheets

(56) References Cited

U.S. PATENT DOCUMENTS

| | | | |
|---|---|---|---|
| 2003/0132040 A1 | 7/2003 | Radosevich et al. | |
| 2005/0030717 A1* | 2/2005 | Inagaki | H01L 23/4334 361/699 |
| 2005/0259402 A1* | 11/2005 | Yasui | H02M 7/003 361/716 |
| 2008/0251909 A1* | 10/2008 | Tokuyama | H01L 23/473 257/706 |
| 2009/0146293 A1* | 6/2009 | Olesen | H01L 23/473 257/714 |
| 2011/0316143 A1* | 12/2011 | Noritake | H01L 21/565 257/713 |
| 2011/0318884 A1* | 12/2011 | Noritake | H01L 21/565 438/122 |
| 2012/0001341 A1* | 1/2012 | Ide | H01L 23/473 257/773 |
| 2013/0003301 A1* | 1/2013 | Miyamoto | H01L 23/473 361/699 |
| 2013/0335920 A1* | 12/2013 | Murata | H05K 7/20236 361/699 |
| 2014/0198453 A1 | 7/2014 | Zhang et al. | |
| 2014/0340845 A1 | 11/2014 | Straznicky et al. | |
| 2015/0348869 A1* | 12/2015 | Joshi | H01L 23/4735 361/700 |
| 2017/0040241 A1* | 2/2017 | Yoshida | H01L 23/40 |
| 2017/0259672 A1 | 9/2017 | Lei et al. | |
| 2017/0259691 A1 | 9/2017 | Lei et al. | |
| 2017/0265337 A1 | 9/2017 | Lei et al. | |

* cited by examiner

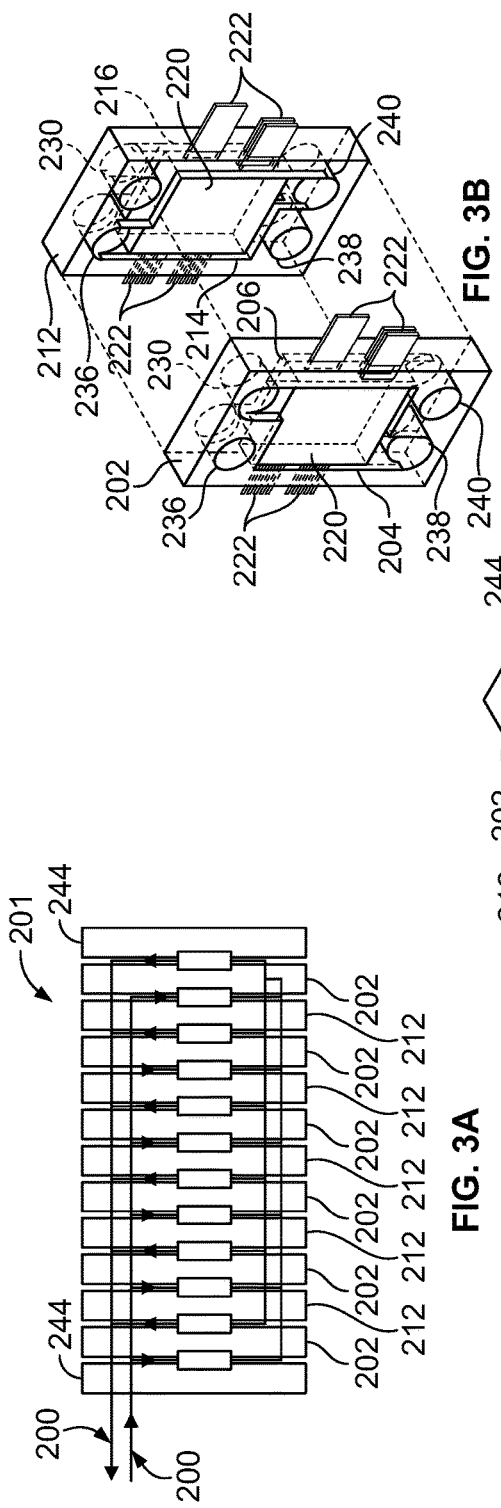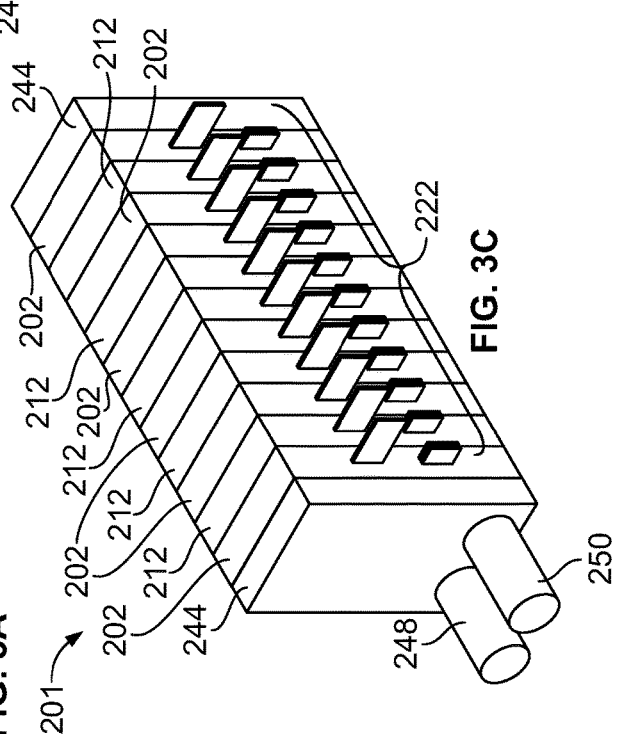

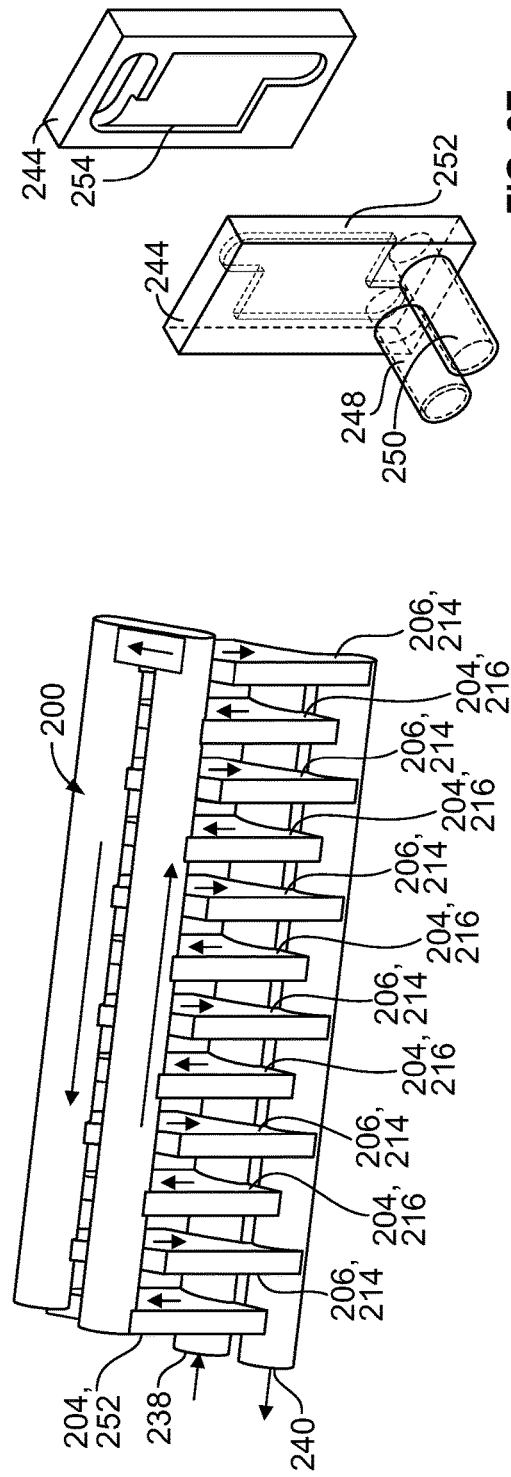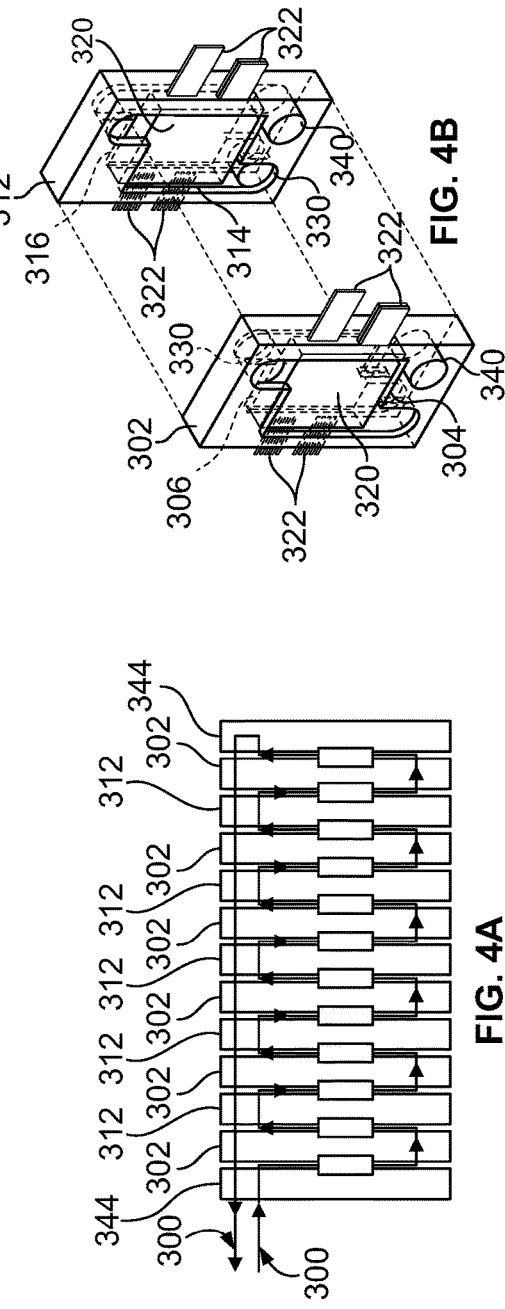

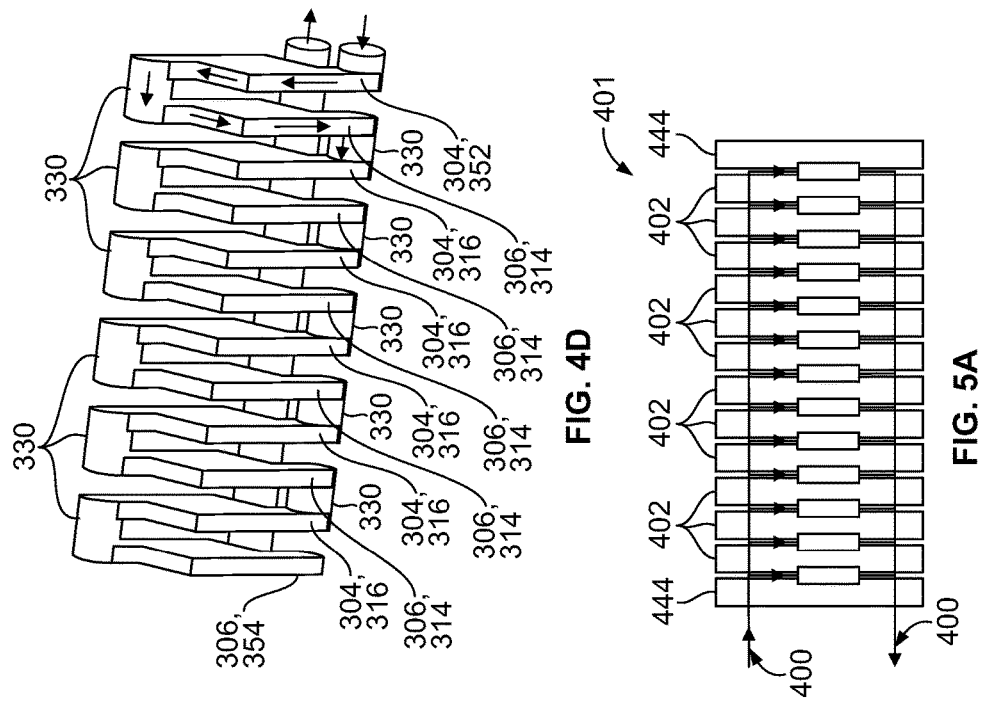
FIG. 4D
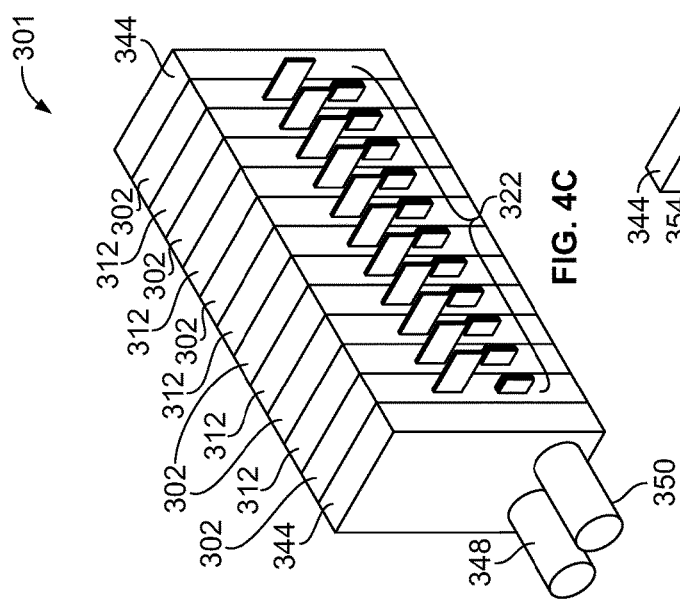
FIG. 4C
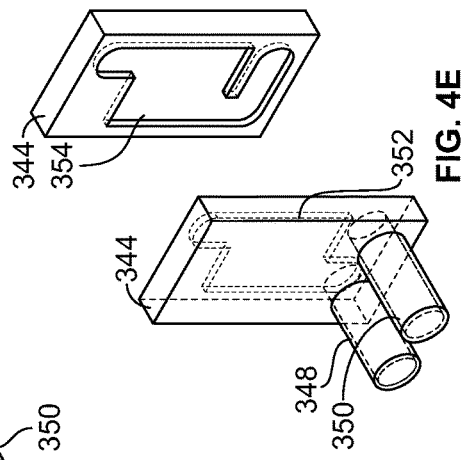
FIG. 4E
FIG. 5A

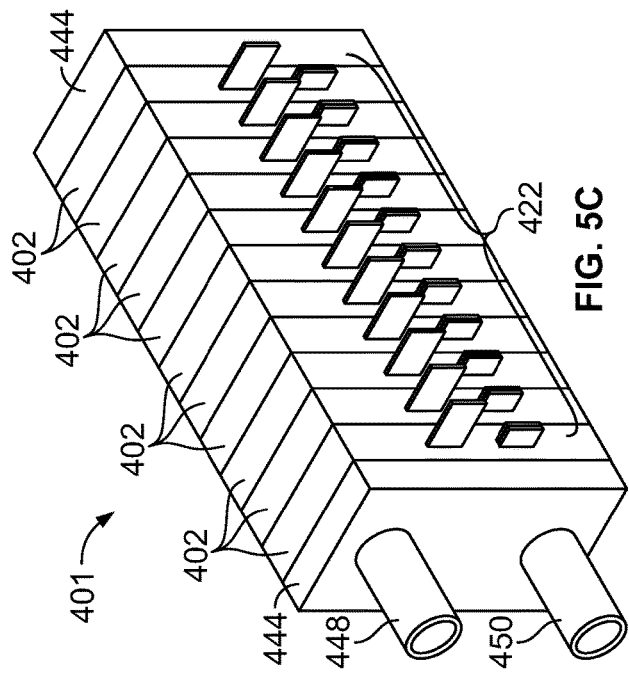
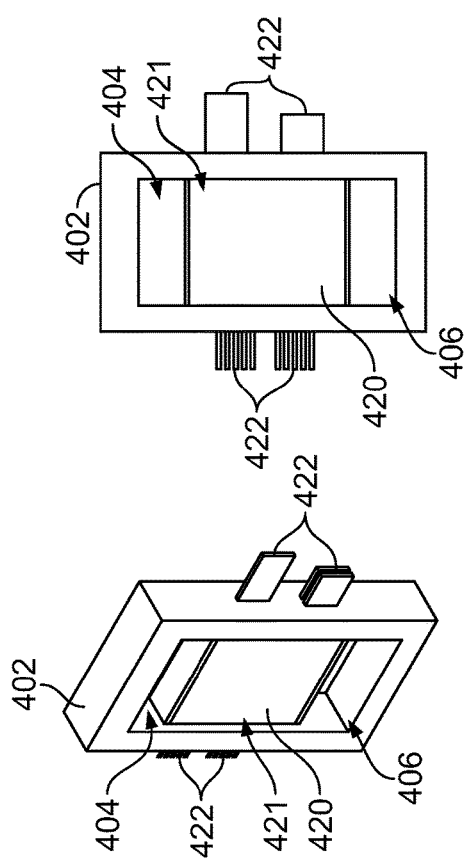
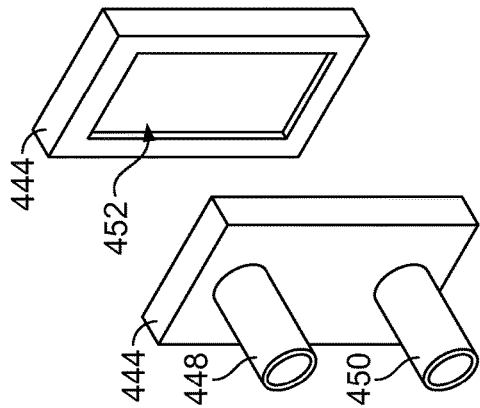
FIG. 5C
FIG. 5B
FIG. 5D

COOLANT CHANNELS FOR POWER MODULE ASSEMBLIES

TECHNICAL FIELD

The present disclosure relates to thermal management of power module assemblies for automotive vehicles.

BACKGROUND

Electrified vehicles such as battery-electric vehicles (BEVs), plug-in hybrid-electric vehicles (PHEVs), mild hybrid-electric vehicles (MHEVs), and full hybrid-electric vehicles (FHEVs) contain an energy storage device, such as a high voltage (HV) battery. A power inverter can be electrically connected between the battery and any electric machines to convert direct current from the battery to alternating current for the electric machines. The power inverter may also convert alternating current from the electric machines to direct current for the battery. Components, such as power module assemblies, may assist in managing thermal conditions thereof.

SUMMARY

A vehicle power module assembly includes a first frame, a second frame, and power stages. The first frame defines a first pair of coolant cavities. The second frame defines a second pair of coolant cavities in communication with the first pair of cavities to define a serial coolant path. Each of the frames houses one of the power stages disposed between the respective pairs of cavities such that coolant flowing through the cavities is in thermal communication with the power stages. Each of the cavities may define a cross-section substantially equal to a cross-section of a face of a corresponding one of the power stages. Each of the frames may further define an outlet cutout for substantial registration with one another when the frames are stacked adjacent to one another. The assembly may further include a pair of endplates, one of which defines a channel to divert coolant from a last of the pair of coolant cavities to the outlet cutouts in substantial registration with one another. Each of the first frame and second frame may further define a pass-through fluidly connecting the pair of coolant cavities. The pass-through may be located at a below or above orientation relative to a corresponding one of the power stages. One of the first pair of coolant cavities may be in substantial registration with one of the second pair of coolant cavities.

A vehicle power module assembly includes a first frame, a second frame, and power stages. The first frame defines a first cavity and a second cavity. The second frame defines a third cavity in communication with the second cavity, and defines a fourth cavity in communication with the first cavity. Each of the frames houses one of the power stages disposed between the cavities of the respective frame. The frames are arranged to define a mixed series and parallel coolant flow path. Each of the frames may further define a primary channel connecting adjacent first and fourth cavities. Each of the frames may further define a secondary channel connecting adjacent second and third cavities. Each of the frames may further define a portion of an outlet such that when the frames are aligned the portions of the outlets of adjacent frames are in substantial registration with one another for coolant to flow therethrough. The assembly may include a pair of endplates compressing the frames therebetween. One of the endplates may define a transition channel in communication with the outlets to transfer coolant flow.

One of the endplates may define an inlet open to a primary channel of the frames and an outlet open to a secondary channel of the frames.

A vehicle power module assembly includes a stack of frames and power stages. Each of the frames defines a first channel in communication with a second channel to define a parallel coolant path. A power stage is disposed within each of the frames, located between the first and second channels, and offset from inner and outer surfaces of the frames to define a pair of cavities connecting the first and second channels. The frames are arranged with one another such that coolant flowing within the channels travels through the first channels and then the second channels of each frame. Each of the frames may further define one or more pass-throughs for electrical components to extend therethrough. The assembly may include a pair of endplates arranged to compress the stack of frames. One of the endplates may define an inlet open to the first channels and an outlet open to the second channels. One of the endplates may define an endplate cavity for fluid from the channels to flow therethrough. Each of the endplates may further define a power stage cavity arranged with an adjacent frame to receive at least a portion of the adjacent power stage. A cross-section of each of the cavities may be substantially equal to a cross-section of the power stage.

BRIEF DESCRIPTION OF THE DRAWINGS

FIG. 3A is a schematic diagram of an example of a mixed serial and parallel flow path for coolant of a power module assembly.

FIG. 3B is a perspective view of examples of housings for power stages of a power module assembly.

FIG. 3C is a perspective view of an example of a stack of the housings and power stages of FIG. 3B and two endplates.

FIG. 3D is a perspective view of the coolant path of FIG. 3A.

FIG. 3E is a perspective view of the two endplates of FIG. 3C.

FIG. 4A is a schematic diagram of an example of a serial flow path for coolant of a power module assembly.

FIG. 4B is a perspective view of examples of housings for power stages of a power module assembly.

FIG. 4C is a perspective view of an example of a stack of the housings and power stages of FIG. 4B and two endplates.

FIG. 4D is a perspective view of the coolant path of FIG. 4A.

FIG. 4E is a perspective view of the two endplates of FIG. 4C.

FIG. 5A is a schematic diagram of an example of a parallel flow path for coolant of a power module assembly.

FIG. 5B is a perspective view of examples of a frame for power stages of a power module assembly.

FIG. 5C is a perspective view of an example of a stack of the frames and power stages of FIG. 5B and two endplates.

FIG. 5D is a perspective view of the two endplates of FIG. 5C.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
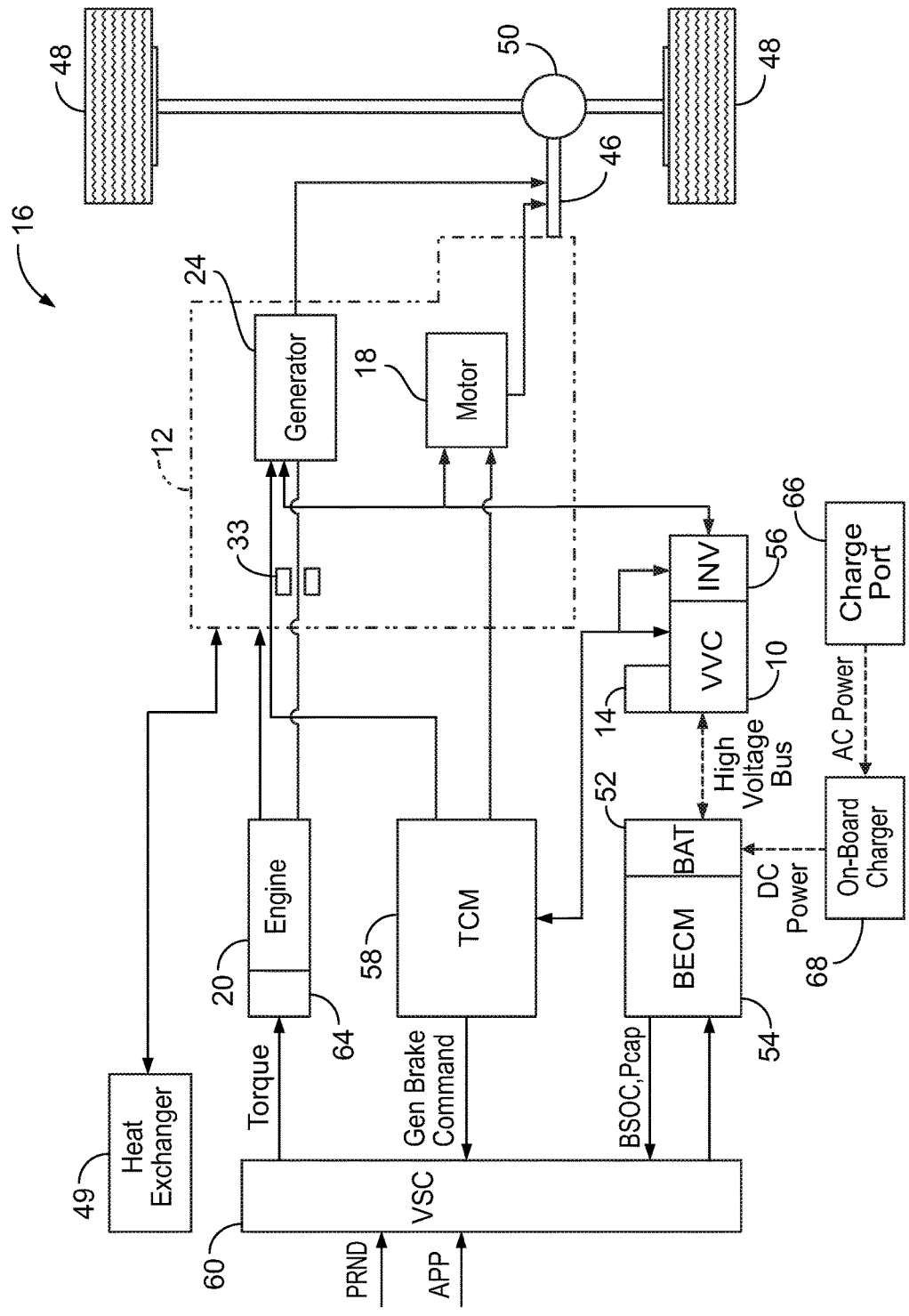
FIG. 1 is a schematic diagram of an example of an electrified vehicle.

An example of a PHEV is depicted in FIG. 1, referred to generally as a vehicle 16 herein. The vehicle 16 may include a transmission 12 and is an example of an electric vehicle propelled by an electric machine 18 with assistance from an internal combustion engine 20. The vehicle 16 may be connectable to an external power grid. The electric machine 18 may be an AC electric motor depicted as a motor 18 in FIG. 1. The electric machine 18 receives electrical power and provides torque for vehicle propulsion. The electric machine 18 may also function as a generator for converting mechanical power into electrical power through regenerative braking.

The transmission 12 may be a power-split configuration. The transmission 12 may include the first electric machine 18 and a second electric machine 24. The second electric machine 24 may be an AC electric motor depicted as a generator 24 in FIG. 1. Similar to the first electric machine 18, the second electric machine 24 may receive electrical power and provide output torque. The second electric machine 24 may also operate as a generator for converting mechanical power into electrical power and optimizing power flow through the transmission 12. In other embodiments, the transmission may not have a power-split configuration.

The transmission 12 may include a planetary gear unit (not shown) and may operate as a continuously variable transmission and without any fixed or step ratios. The transmission 12 may also include a one-way clutch (O.W.C.) and a generator brake 33. The O.W.C. may be coupled to an output shaft of the engine 20 to control a direction of rotation of the output shaft. The O.W.C. may prevent the transmission 12 from back-driving the engine 20. The generator brake 33 may be coupled to an output shaft of the second electric machine 24. The generator brake 33 may be activated to "brake" or prevent rotation of the output shaft of the second electric machine 24. Alternatively, the O.W.C. and the generator brake 33 may be replaced by implementing control strategies for the engine 20 and the second electric machine 24. The transmission 12 may be connected to a driveshaft 46. The driveshaft 46 may be coupled to a pair of drive wheels 48 through a differential 50. An output gear (not shown) of the transmission may assist in transferring torque between the transmission 12 and the drive wheels 48. The transmission 12 may also be in communication with a heat exchanger 49 or an automatic transmission fluid cooler (not shown) for cooling the transmission fluid.

The vehicle 16 includes an energy storage device, such as a traction battery 52 for storing electrical energy. The battery 52 may be a HV battery capable of outputting electrical power to operate the first electric machine 18 and the second electric machine 24 as further described below. The battery 52 may also receive electrical power from the first electric machine 18 and the second electric machine 24 when they are operating as generators. The battery 52 may be a battery pack made up of several battery modules (not shown), where each battery module contains a plurality of battery cells (not shown). Other embodiments of the vehicle 16 contemplate alternative types of energy storage devices, such as capacitors and fuel cells (not shown) that may supplement or replace the battery 52.

A high voltage bus may electrically connect the battery 52 to the first electric machine 18 and to the second electric machine 24. For example, the vehicle 16 may include a battery energy control module (BECM) 54 for controlling the battery 52. The BECM 54 may receive input indicative of certain vehicle conditions and battery conditions, such as battery temperature, voltage, and current. The BECM 54 may calculate and estimate parameters of the battery 52, such as a battery state of charge (BSOC) and a battery power capability (Pcap). The BECM 54 may provide output that is indicative of the BSOC and Pcap to other vehicle systems and controllers.

The vehicle 16 may include a DC-DC converter or variable voltage converter (VVC) 10 and an inverter 56. The VVC 10 and the inverter 56 may be electrically connected between the battery 52 and the first electric machine 18 and the second electric machine 24. The VVC 10 may "boost" or increase a voltage potential of electrical power provided by the battery 52. The VVC 10 may also "buck" or decrease voltage potential of the electrical power provided to the battery 52. The inverter 56 may invert DC power supplied by the battery 52 via the VVC 10 to AC power for operating each of the electric machines 18 and 24. The inverter 56 may also rectify AC power provided by each of the electric machines 18 and 24 to DC for charging the battery 52. In other examples, the transmission 12 may operate with multiple inverters, such as one invertor associated with each of the electric machine 18 and 24. The VVC 10 includes an inductor assembly 14 (further described in relation to FIG. 2).

The transmission 12 is shown in communication with a transmission control module (TCM) 58 for controlling the electric machines 18 and 24, the VVC 10, and the inverter 56. The TCM 58 may be configured to monitor conditions of each of the electric machines 18 and 24 such as position, speed, and power consumption. The TCM 58 may also monitor electrical parameters (e.g., voltage and current) at various locations within the VVC 10 and the inverter 56. The TCM 58 provides output signals corresponding to this information for other vehicle systems to utilize.

The vehicle 16 may include a vehicle system controller (VSC) 60 that communicates with other vehicle systems and controllers for coordinating operations thereof. Although shown as a single controller, it is contemplated that the VSC 60 may include multiple controllers to control multiple vehicle systems and components according to an overall vehicle control logic or software.

The vehicle controllers, such as the VSC 60 and the TCM 58, may include various configurations of microprocessors, ASICs, ICs, memory (e.g., FLASH, ROM, RAM, EPROM and/or EEPROM), and software code to cooperate with one another to perform vehicle operations. The controllers may also include predetermined data, or "look up tables," which are accessible from the memory and may be based on calculations and test data. This predetermined data may be utilized by the controllers to facilitate control of the vehicle operations. The VSC 60 may communicate with other vehicle systems and controllers (e.g., the BECM 54 and the TCM 58) over one or more wired or wireless connections using bus protocols such as CAN and LIN. The VSC 60 may receive input (PRND) that represents a current position of the transmission 12 (e.g., park, reverse, neutral or drive). The VSC 60 may also receive input (APP) that represents an accelerator pedal position. The VSC 60 may provide outputs representative of a desired wheel torque, desired engine speed, and a generator brake command to the TCM 58; and contactor control to the BECM 54.

The vehicle 16 may include an engine control module (ECM) 64 for controlling the engine 20. The VSC 60 provides output, such as desired engine torque, to the ECM 64 that may be based on a number of input signals including APP and may correspond to a driver's request for vehicle propulsion.

The battery 52 may periodically receive AC energy from an external power supply or grid via a charge port 66. The vehicle 16 may also include an on-board charger 68 which receives the AC energy from the charge port 66. The charger 68 may include AC/DC conversion capability to convert the received AC energy into DC energy suitable for charging the battery 52 during a recharge operation. Although illustrated and described in the context of a PHEV, it is contemplated that the inverter 56 may be implemented with other types of electrified vehicles, such as a FHEV or a BEV.

Figure 2:
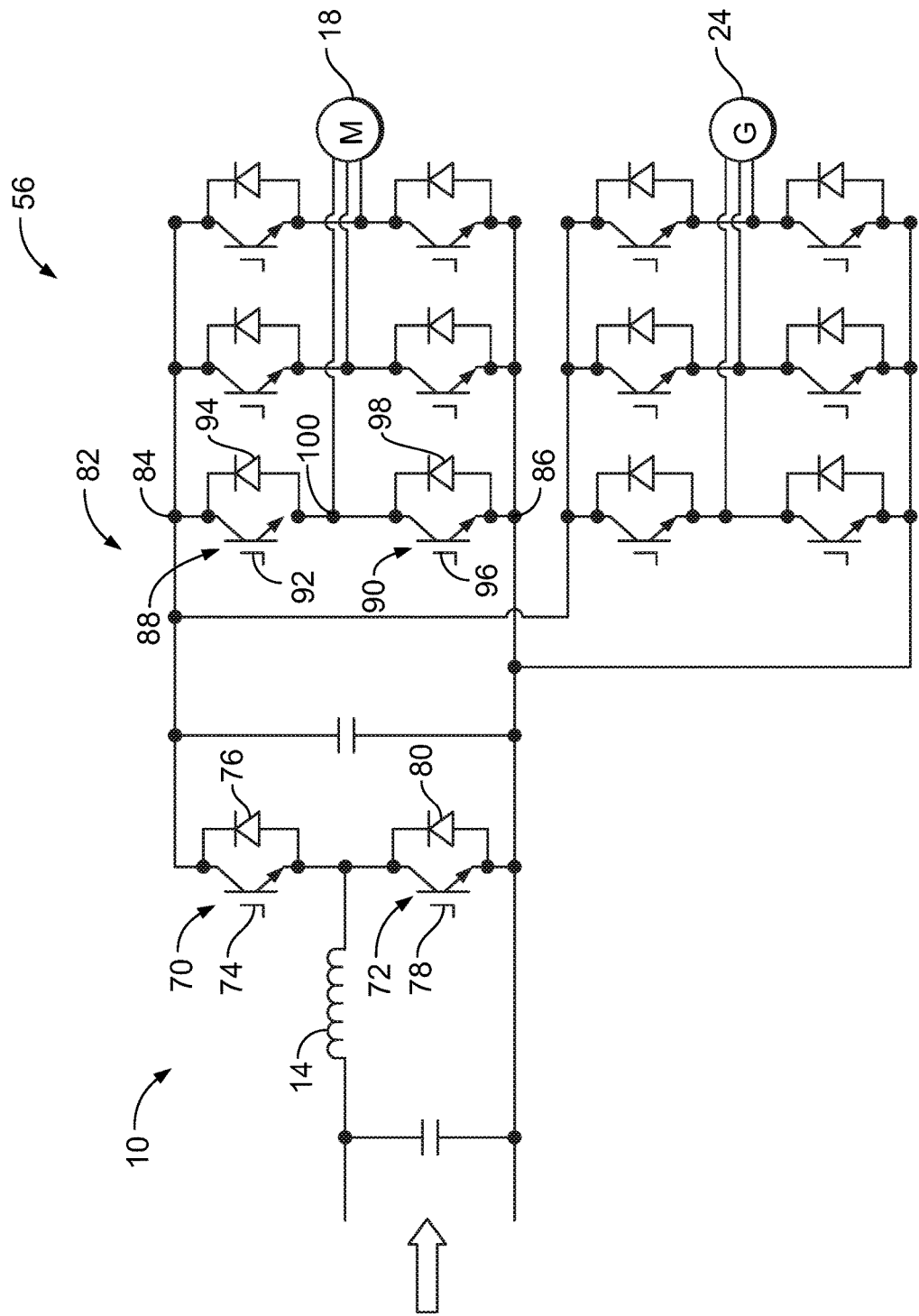
FIG. 2 is a schematic diagram of a variable voltage converter and power inverter.

Referring to FIG. 2, an example of an electrical schematic of the VVC 10 and the inverter 56 is shown. The VVC 10 may include a first switching unit 70 and a second switching unit 72 for boosting the input voltage (V_bat) to provide output voltage (V_dc). The first switching unit 70 is shown with a first transistor 74 connected in parallel to a first diode 76 and with their polarities switched (referred to as anti-parallel herein). The second switching unit 72 is shown with a second transistor 78 connected anti-parallel to a second diode 80. Each of the transistors 74 and 78 may be a type of controllable switch (e.g., an insulated gate bipolar transistor (IGBT) or field-effect transistor (FET)). Additionally, each of the transistors 74 and 78 may be individually controlled by the TCM 58. The inductor assembly 14 is depicted as an input inductor that is connected in series between the battery 52 and the switching units 70 and 72. The inductor assembly 14 may generate magnetic flux when a current is supplied. When the current flowing through the inductor assembly 14 changes, a time-varying magnetic field is created and a voltage is induced. Other embodiments of the VVC 10 may include alternative circuit configurations (e.g., more than two switches).

The inverter 56 may include a plurality of half-bridges 82 stacked in an assembly. Each of the half-bridges 82 may be packaged as a power stage. In the illustrated example, the inverter 56 includes six half-bridges (though FIG. 2 labels only one complete half-bridge 82), three for the motor 18 and three for the generator 24. Each of the half bridges 82 may include a positive DC lead 84 that is coupled to a positive DC node from the battery 52 and a negative DC lead 86 that is coupled to a negative DC node from the battery 52. Each of the half bridges 82 may also include a first switching unit 88 and a second switching unit 90. The first switching unit 88 includes a first transistor 92 connected in parallel to a first diode 94. The second switching unit 90 includes a second transistor 96 connected in parallel to a second diode 98. The first transistor 92 and the second transistors 96 may be IGBTs or FETs. The first switching unit 88 and the second switching unit 90 of each of the half-bridges 82 converts the DC power of the battery 52 into a single phase AC output at the AC lead 100. Each of the AC leads 100 is electrically connected to the motor 18 or generator 24. In this example, three of the AC leads 100 are electrically connected to the motor 18 and the other three AC leads 100 are electrically connected to the generator 24.

FIG. 3A through 3E show an example of portions of a power module assembly which includes a mixed series and parallel coolant path. FIG. 3A shows a schematic diagram of a mixed series and parallel coolant flow path 200. The coolant flow path 200 may be defined by components of a power module assembly 201 including a plurality of alternatively stacked frames and a pair of endplates. For example, a first frame 202 may define a first cavity 204 and a second cavity 206. A second frame 212 may define a third cavity 214 and a fourth cavity 216. The first frame 202 and the second frame 212 may be stacked adjacent to one another. The first cavity 204 may be open to the fourth cavity 216 and the second cavity 206 may be open to the third cavity 214. It is contemplated that a plurality of first frames 202 and second frames 212 may be stacked with one another in an alternating fashion.

The first frame 202 and the second frame 212 may be arranged with one another such that the first cavity 204 and the fourth cavity 216 are in communication with one another. The first frame 202 and the second frame 212 may be arranged with one another such that the second cavity 206 and the third cavity 214 are in communication with one another. A power stage 220 may be housed within each of the frames and may assist in separating the respective cavities. Each of the first frames 202 and the second frames 212 may include passthroughs for electrical components 222 to extend therethrough. The electrical components 222 may be connected to the respective power stage 220 supported by each of the frames. The electrical components 222 may be, for example, signal pins or busbars.

Each of the frames may define one or more primary channels 230 located for substantial registration with one of another primary channel 230 when the frames are stacked. The primary channel 230 may assist in connecting adjacent first cavities 204 and fourth cavities 216. Each of the frames may define one or more secondary channels 236 located for substantial registration with one of another secondary channel 236 when the frames are stacked. The secondary channel 236 may assist in connecting adjacent second cavities 206 and third cavities 214.

Each of the frames may define a portion of an inlet channel 238 such that when the frames are stacked the portions of the inlet channels 238 are in substantial registration with one another for coolant to flow therethrough. The inlet channels 238 may be in communication with each of the cavities to deliver coolant thereto. Each of the frames may define a portion of an outlet channel 240 such that when the frames are stacked the portions of the outlet channels 240 are in substantial registration with one another for coolant to flow therethrough. The outlet channels 240 may be in communication with each of the cavities such that coolant may be directed out of the power module assembly 201.

A pair of endplates 244 may be disposed at either end of the stacked frames. One of the endplates 244 may include an inlet 248 for the inlet channel 238 and an outlet 250 for the outlet channel 240. The endplates 244 may compress the frames therebetween. One of the endplates 244 may define a first endplate cavity 252 for alignment with a cavity of an adjacent frame. One of the endplates 244 may define a second endplate cavity 254 to assist in transferring coolant from a cavity of an adjacent frame to the secondary channel 236.

In operation, coolant may enter the mixed series and parallel coolant flow path 200 vial the inlet 248. The coolant may then flow through each of the inlet channels 238 enroute to the cavities 204 and 214 along the stacked frames 202 and 212 to the respective primary channel 230. The coolant may assist in managing thermal conditions, such as drawing heat, of the respective power stage 220 when flowing through the cavities 204 and 214. The coolant may then flow from the last primary channel 230 in the stack of frames through the second endplate cavity 254 and then to the secondary channels 236. From the secondary channels 236 the coolant may flow through the cavities 206 and 216 enroute to the outlet channels 240. The coolant may assist in managing thermal conditions, such as drawing heat, from the respective power stage 220 when flowing through the cavities 206 and 216. Coolant may exit the power module assembly 201 via the outlet 250.

FIGS. 4A through 4E show portions of a power module assembly which include a series coolant flow path. FIG. 4A shows a schematic diagram of a series coolant flow path 300. The series coolant flow path 300 may be defined by components of a power module assembly 301 including a plurality of alternatively stacked frames and a pair of endplates. For example, a first frame 302 may define a first cavity 304 and a second cavity 306. A second frame 312 may define a third cavity 314 and a fourth cavity 316. The first frame 302 and the second frame 312 may be stacked adjacent to one another. It is contemplated that a plurality of first frames 302 and second frames 312 may be stacked with one another in an alternating fashion.

The first frame 302 and the second frame 312 may be arranged with one another such that the cavities are in communication with one another. For example, the second cavity 306 and the third cavity 314 may be open to one another when the first frame 302 and the second frame 312 are stacked next to one another. In another example, the first cavity 304 and the fourth cavity 316 may be open to one another when the first frame 302 and the second frame 312 are stacked next to one another. A power stage 320 may be housed within each of the frames and may assist in separating the respective cavities. Each of the power stages 320 may define a cross-sectional area substantially equal to a cross-section area of one of the cavities. Each of the first frames 302 and the second frames 312 may include passthroughs for electrical components 322 to extend therethrough. The electrical components 322 may be connected to the respective power stage 320 supported by each of the frames. The electrical components 322 may be, for example, signal pins or busbars.

Each of the frames may define one or more transfer channels 330 to assist in connecting the respective pair of cavities within a frame. For example, a transfer channel 330 may connect the first cavity 304 and the second cavity 306. Each of the frames may define a portion of an outlet channel 340 such that when the frames are stacked the portions of the outlet channels 340 are in substantial registration with one another for coolant to flow therethrough. The portions of the outlet channels 340 may be in communication with the cavities such that coolant may be directed out of the power module assembly 301.

For example, a pair of endplates 344 may be disposed at either end of the stacked frames. One of the endplates 344 may include an inlet 348 in communication with the cavities and an outlet 350 for the outlet channel 340. The endplates 344 may compress the frames therebetween. One of the endplates 344 may define a first endplate cavity 352 for alignment with a cavity of an adjacent frame. One of the endplates 344 may define a second endplate cavity 354 to assist in transferring coolant from a cavity of an adjacent frame to the outlet channel 340.

In operation, coolant may enter the series coolant flow path 300 via the inlet 348. The coolant may then circulate through subsequent cavities defined by the respective frame to assist in managing thermal conditions of the power stages 320. For example, each transfer channel 330 may assist in transferring the coolant from the second cavity 306 and the third cavity 314 to the first cavity 304 and the fourth cavity 316. The transfer channel 330 may be defined in various positions of the respective frame, such as above or below the power stage 320 disposed therein. The endplate 344 defining the second endplate cavity 354 may then assist in transferring the coolant to the outlet channel 340 such that the coolant may be removed from the power module assembly 201 via the outlet 350.

FIGS. 5A through 5E show portions of a power module assembly which include a parallel coolant flow path. FIG. 5A shows a schematic diagram of a parallel coolant flow path 400. The parallel coolant flow path 400 may be defined by components of a power module assembly 401 including a plurality of stacked frames and a pair of endplates. For example, a frame 402 may define a first channel 404 and a second channel 406. A plurality of the frames 402 may be stacked adjacent to one another such that the first channels 404 are in substantial registration with one another and such that the second channels 406 are in substantial registration with one another.

The frames 402 may be arranged with one another such that the channels are in communication with one another. For example, the first channels 404 and the second channels 406 may be open to one another when the frames 402 are stacked next to one another. The frames 402 may be arranged with one another such that coolant flowing with the channels travels through the first channels 404 and then along power stages 420 enroute to the second channels 406.

For example, the power stage 420 may offset from inner and outer surfaces of the frames to define a pair of cavities. The power stage 420 may be housed within each of the frames 402 such that each of a pair of cavities 421 is defined on either side of the power stage 420. Each cavity 421 is open to both the first channel 404 and the second channel 406. The frames 402 may be arranged with one another such that adjacent cavities 421 join to form a larger cavity.

Each of the frames 402 may include pass-throughs for electrical components 422 to extend therethrough. The electrical components 422 may be connected to the respective power stage 420 supported by each of the frames. The electrical components 422 may be, for example, signal pins or busbars. The power stages 420 may be offset from a surface of the frames such that a channel is defined between power stages 420 that is open to the respective first channel 404 and the respective second channel 406.

A pair of endplates 444 may be disposed at either end of the stacked frames. One of the endplates 444 may include an inlet 448 in communication with the first channels 404 and an outlet 450 in communication with the second channels 406. The endplates 444 may compress the frames therebetween. One of the endplates 444 may define a first endplate cavity 452 for alignment with the channels of the adjacent frame 402. The endplate cavity 452 may provide a path for coolant to flow through and along an adjacent power stage 420. In operation, coolant may enter the parallel coolant flow path 400 via the inlet 448. The coolant may travel along the first channels 404, then in between the power stages 420 along the cavities 421 enroute to the second channels 406. The coolant may then exit the power module assembly 401 via the outlet 450.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle power module assembly comprising:
   a frame defining a cavity, an inlet, an outlet, and a second cavity;
   a second frame defining a second inlet for registration with the inlet, a second outlet for registration with the outlet, a third cavity open to the second cavity, and a fourth cavity open to cavity; and
   a power stage housed between respective cavities arranged to define a mixed series and parallel coolant flow path.

2. The assembly of claim 1, wherein each of the frames further defines a primary channel connecting the first and fourth cavities adjacent one another.

3. The assembly of claim 1, wherein each of the frames further defines a secondary channel connecting the second and third cavities adjacent one another.

4. The assembly of claim 1 further comprising a pair of endplates compressing the frames therebetween, wherein one of the endplates defines a transition channel in communication with the outlets to transfer coolant flow.

5. The assembly of claim 1 further comprising a pair of endplates compressing the frames therebetween, wherein one of the endplates defines an external inlet open to a primary channel of the frames and an external outlet open to a secondary channel of the frames.

* * * * *

UNITED STATES PATENT AND TRADEMARK OFFICE
CERTIFICATE OF CORRECTION

PATENT NO. : 10,017,073 B2
APPLICATION NO. : 15/065164
DATED : July 10, 2018
INVENTOR(S) : Guangyin Lei et al.

Page 1 of 1

It is certified that error appears in the above-identified patent and that said Letters Patent is hereby corrected as shown below:

In the Claims

Column 10, Lines 7-8, Claim 1:
After "a fourth cavity open to"
Insert -- the --.

Signed and Sealed this
Twenty-eighth Day of May, 2019

Andrei Iancu
*Director of the United States Patent and Trademark Office*